United States Patent
Alahyari et al.

(10) Patent No.: US 11,884,409 B2
(45) Date of Patent: Jan. 30, 2024

(54) AIRCRAFT ELECTRIC MOTOR WITH INTEGRATED COOLING SYSTEM

(71) Applicant: Hamilton Sundstrand Corporation, Charlotte, NC (US)

(72) Inventors: Abbas A Alahyari, Glastonbury, CT (US); Kimberly Rae Saviers, Glastonbury, CT (US); Joseph Turney, Amston, CT (US); Jagadeesh Kumar Tangudu, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 157 days.

(21) Appl. No.: 17/515,934

(22) Filed: Nov. 1, 2021

(65) Prior Publication Data
US 2023/0138133 A1    May 4, 2023

(51) Int. Cl.
| | |
|---|---|
| *H02K 9/197* | (2006.01) |
| *H02K 7/16* | (2006.01) |
| *H02K 1/20* | (2006.01) |
| *H02K 1/30* | (2006.01) |
| *B64D 27/24* | (2006.01) |
| *B64D 33/08* | (2006.01) |

(52) U.S. Cl.
CPC ............. *B64D 27/24* (2013.01); *B64D 33/08* (2013.01); *H02K 9/197* (2013.01)

(58) Field of Classification Search
CPC ............ H02K 9/197; H02K 7/16; H02K 1/20; H02K 1/30
USPC ........ 310/52, 53, 58, 156.7, 156.12, 156.19, 310/265, 266, 54
See application file for complete search history.

(56) References Cited

U.S. PATENT DOCUMENTS

| | | |
|---|---|---|
| 4,376,902 A | 3/1983 | Soussa |
| 9,461,523 B2 | 10/2016 | Shoykhet |
| 2006/0113851 A1 | 6/2006 | Ishihara et al. |

(Continued)

FOREIGN PATENT DOCUMENTS

| | | | | |
|---|---|---|---|---|
| CN | 103066783 A | * | 4/2013 | ............. H02K 1/276 |
| CN | 108793237 A | * | 11/2018 | ........... C01G 23/022 |

(Continued)

OTHER PUBLICATIONS

Extended European Search Report dated Mar. 27, 2023; EP Application No. 22191734.7-1202; 7 pages.

*Primary Examiner* — Jose A Gonzalez Quinones
(74) *Attorney, Agent, or Firm* — CANTOR COLBURN LLP

(57) ABSTRACT

Aircraft electric motors include a motor unit having a rotor and a stator. The stator includes a plurality of windings and cooling channels arranged to provide cooling thereto. A drive unit is configured to drive operation of the motor unit. A cooling system includes a working fluid arranged within a cooling fluid flow path, wherein the cooling fluid flow path includes a liquid cooling path configured to direct flow of the working fluid through, at least, the cooling channels of the motor unit and a vapor cooling path configured to direct flow of the working fluid through the drive unit and a separator arranged upstream of each of the liquid cooling path and the vapor cooling path and configured to direct a liquid portion of the working fluid into the liquid cooling path and configured to direct a vapor portion of the working fluid into the vapor cooling path.

20 Claims, 9 Drawing Sheets

(56) References Cited

U.S. PATENT DOCUMENTS

| | | | |
|---|---|---|---|
| 2008/0278019 A1 | 11/2008 | Lu et al. | |
| 2017/0005548 A1 | 1/2017 | Salat et al. | |
| 2021/0190395 A1* | 6/2021 | Snell | H02K 5/20 |
| 2021/0293174 A1 | 9/2021 | Lighty et al. | |
| 2022/0315231 A1* | 10/2022 | Tangudu | H02K 7/116 |

FOREIGN PATENT DOCUMENTS

| | | | |
|---|---|---|---|
| FR | 2823382 A1 * | 10/2002 | B60K 6/26 |
| JP | 2005312272 A | 11/2005 | |
| JP | 2020051662 A * | 4/2020 | |
| WO | 2012082592 A1 | 6/2012 | |

* cited by examiner

AIRCRAFT ELECTRIC MOTOR WITH INTEGRATED COOLING SYSTEM

STATEMENT OF FEDERAL SUPPORT

This invention was made with government support under Contract No. DE-AR0001351 awarded by the U.S. Department of Energy. The government has certain rights in the invention.

BACKGROUND

The present disclosure relates to electric motors, and more particularly, to electric motor assemblies with high efficiency and power density with a light weight for aircraft applications.

Traditional electric motors may include a stator and a rotor, with electrical motor windings in the stator that, when energized, drive rotation of the rotor about a central axis. Heat is generated in the motor windings, which are located in slots in the stator. The windings are separated from the exterior of the motor by layers of insulation and laminated steel, which makes up the stator. These contributors to internal thermal resistance limit the allowable heat generation and thus the allowable electrical current in the windings. The energy density of an electric motor is typically limited by heat dissipation from the motor windings of the stator. The requirement to be met is a maximum hot spot temperature in the motor windings that is not to be exceeded. Conventional motor thermal management includes natural convection from large fins on the outside of a motor jacket, or liquid cooling in the motor jacket. Both of these solutions undesirably add volume and/or weight to the motor, due to the addition of, at least, the jacket.

BRIEF DESCRIPTION

According to some embodiments of the present disclosure, aircraft electric motors are provided. The aircraft electric motors include a motor unit having a rotor and a stator, wherein the stator includes a plurality of windings and cooling channels arranged to provide cooling to the plurality of windings, a drive unit configured to drive operation of the motor unit, and a cooling system. The cooling system includes a working fluid arranged within a cooling fluid flow path, wherein the cooling fluid flow path includes a liquid cooling path configured to direct flow of the working fluid through, at least, the cooling channels of the motor unit and a vapor cooling path configured to direct flow of the working fluid through the drive unit and a separator arranged upstream of each of the liquid cooling path and the vapor cooling path and configured to direct a liquid portion of the working fluid into the liquid cooling path and configured to direct a vapor portion of the working fluid into the vapor cooling path.

In addition to one or more of the features described herein, or as an alternative, further embodiments of the aircraft electric motors may include a mixer arranged along the cooling fluid flow path and configured to merge the flow of the liquid cooling path and the vapor cooling path at a location downstream of the motor unit and the drive unit.

In addition to one or more of the features described herein, or as an alternative, further embodiments of the aircraft electric motors may include a heat exchanger arranged along the cooling fluid flow path and configured to cool the working fluid to a liquid state.

In addition to one or more of the features described herein, or as an alternative, further embodiments of the aircraft electric motors may include a mixer arranged along the cooling fluid flow path downstream of the motor unit and the drive unit and upstream of the heat exchanger, the mixer configured to merge the flow of the liquid cooling path and the vapor cooling path.

In addition to one or more of the features described herein, or as an alternative, further embodiments of the aircraft electric motors may include that the working fluid is a first fluid of the heat exchanger and air is a second fluid of the heat exchanger, wherein the air passed through the heat exchanger to cool the working fluid.

In addition to one or more of the features described herein, or as an alternative, further embodiments of the aircraft electric motors may include a reservoir configured to contain the working fluid in a liquid state to be supplied to the separator.

In addition to one or more of the features described herein, or as an alternative, further embodiments of the aircraft electric motors may include a pump arranged upstream of the separator and configured to provide a motive force to the working fluid to flow through the cooling fluid flow path.

In addition to one or more of the features described herein, or as an alternative, further embodiments of the aircraft electric motors may include a control valve arranged along the liquid cooling flow path to control a flow rate of the working fluid through the liquid cooling flow path.

In addition to one or more of the features described herein, or as an alternative, further embodiments of the aircraft electric motors may include a control valve arranged along the vapor cooling flow path to control a flow rate of the working fluid through the vapor cooling flow path.

In addition to one or more of the features described herein, or as an alternative, further embodiments of the aircraft electric motors may include that the vapor cooling path includes both a vapor state of the working fluid and liquid droplets of the working fluid.

In addition to one or more of the features described herein, or as an alternative, further embodiments of the aircraft electric motors may include that the working fluid is a saturated refrigerant.

In addition to one or more of the features described herein, or as an alternative, further embodiments of the aircraft electric motors may include that the refrigerant is a hydrofluorocarbon (HFC), a hydrofluro-olefin (HFO), or a hydrofluoroether (HFE).

In addition to one or more of the features described herein, or as an alternative, further embodiments of the aircraft electric motors may include that the windings are arranged in a U-shape configuration.

In addition to one or more of the features described herein, or as an alternative, further embodiments of the aircraft electric motors may include that the motor unit comprises rotor having U-shaped magnets arranged about the windings of the stator.

In addition to one or more of the features described herein, or as an alternative, further embodiments of the aircraft electric motors may include that the separator is part of a header fluidly connected to the cooling channels.

In addition to one or more of the features described herein, or as an alternative, further embodiments of the aircraft electric motors may include that at least one cooling channel includes a restrictor configured to control flow through the respective cooling channel.

In addition to one or more of the features described herein, or as an alternative, further embodiments of the aircraft electric motors may include that the liquid portion is at least 75% liquid state working fluid.

In addition to one or more of the features described herein, or as an alternative, further embodiments of the aircraft electric motors may include that the vapor portion is at least 95% vapor state working fluid.

In addition to one or more of the features described herein, or as an alternative, further embodiments of the aircraft electric motors may include that the rotor and stator are arranged in an annular configuration.

In addition to one or more of the features described herein, or as an alternative, further embodiments of the aircraft electric motors may include that the stator is arranged within the rotor.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

DETAILED DESCRIPTION

Figure 1A:
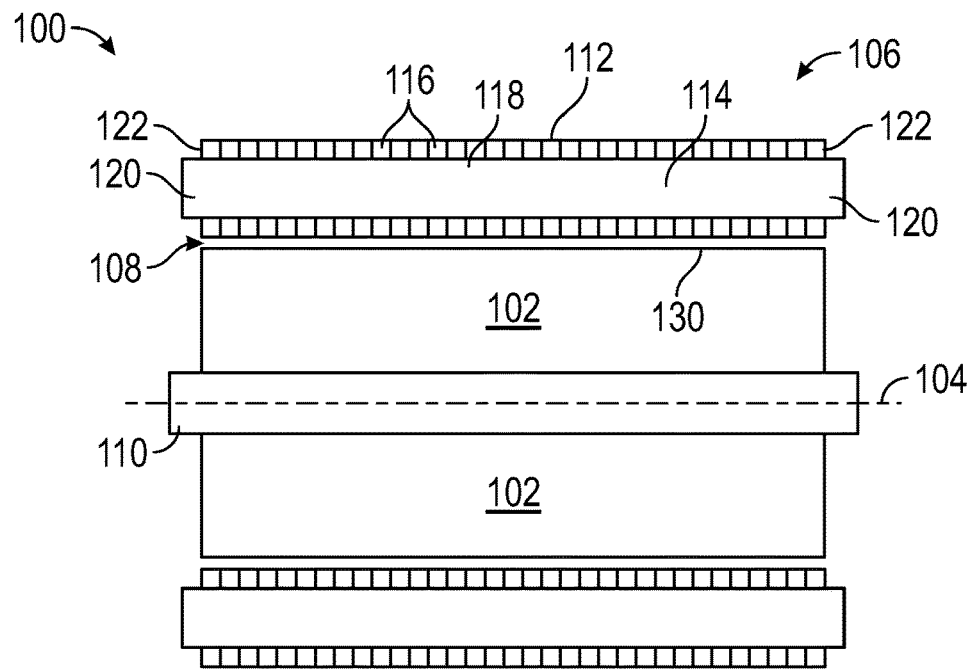
FIG. 1A is a partial view of an embodiment of electric motor.
Figure 1B:
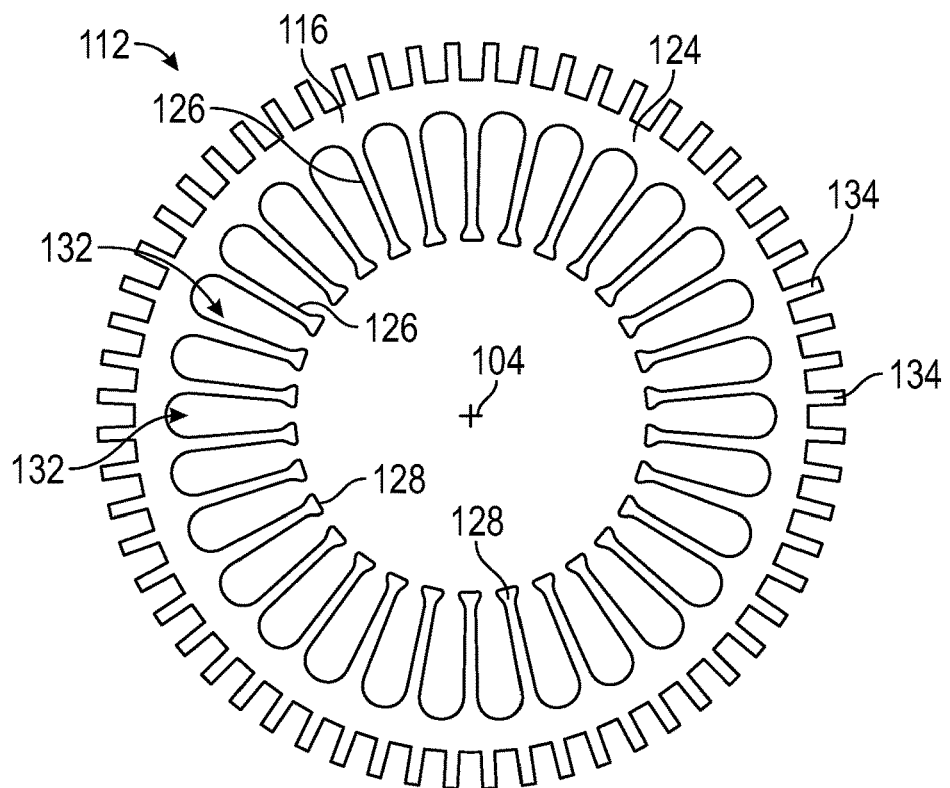
FIG. 1B is a cross-sectional view of an embodiment of a stator core of the electric motor of FIG. 1A.

Referring to FIGS. 1A-1B, schematic illustrations of an electric motor 100 that may incorporate embodiments of the present disclosure are shown. FIG. 1A illustrates a cross-sectional view of the electric motor 100 and FIG. 1B illustrates a cross-sectional view of a stator core of the electric motor 100. The electric motor 100 includes a rotor 102 configured to rotate about a rotation axis 104. A stator 106 is located radially outboard of the rotor 102 relative to the rotation axis 104, with a radial air gap 108 located between the rotor 102 and the stator 106. As illustrated, the rotor 102 may be mounted on a shaft 110 which may impart rotational movement to the rotor 102 or may be driven by rotation of the rotor 102, as will be appreciated by those of skill in the art. The rotor 102 and the shaft 110 may be fixed together such that the rotor 102 and the shaft 110 rotate about the rotation axis 104 together as one piece.

The stator 106 includes a stator core 112 in which a plurality of electrically conductive stator windings 114 are disposed. In some embodiments, such as shown in FIG. 1A, the stator core 112 is formed from a plurality of axially stacked laminations 116, which are stacked along the rotation axis 104. In some embodiments, the laminations 116 are formed from a steel material, but one skilled in the art will readily appreciate that other materials may be utilized. The stator windings 114, as shown, include core segments 118 extending through the stator core 112 and end turn segments 120 extending from each axial stator end 122 of the stator core 112 and connecting circumferentially adjacent core segments 118. When the stator windings 114 are energized via an electrical current therethrough, the resulting field drives rotation of the rotor 102 about the rotation axis 104. Although FIG. 1A illustrates the stator core 112 arranged radially inward from the stator windings 114, it will be appreciated that other configurations are possible without departing from the scope of the present disclosure. For example, in some embodiments, the stator structure may be arranged radially inward from a rotating rotor structure. In some embodiments, the rotor may be both radially inward and outward of the stator, as described herein.

FIG. 1B is an axial cross-sectional view of the stator core 112. Each lamination 116 of the stator core 112 includes a radially outer rim 124 with a plurality of stator teeth 126 extending radially inwardly from the outer rim 124 toward the rotation axis 104. Each of the stator teeth 126 terminate at a tooth tip 128, which, together with a rotor outer surface 130 (shown in FIG. 1A) of the rotor 102, may define the radial air gap 108. Circumferentially adjacent stator teeth 126 define an axially-extending tooth gap 132 therebetween. Further, in some embodiments, a plurality of stator fins 134 extend radially outwardly from the outer rim 124.

Electric motors, as shown in FIGS. 1A-1B may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system.

Onboard an aircraft, power requirements, and thus thermal management system (TMS) loads, are substantially higher during takeoff. Sizing of the TMS for takeoff conditions (i.e., maximum loads) results in a TMS having a high weight to accommodate such loads. This results in greater weight and lower power density during cruise conditions which do not generate such loads, and thus does not require a high cooling capacity TMS. Balancing weight constraints and thermal load capacities is important for such aviation applications.

In view of such considerations, improved aviation electric motors are provided herein. The aviation electric motors or aircraft electric motors, described herein, incorporate lightweight materials and compact design to reduce weight, improve thermal efficiencies, improve power efficiencies, and improve power density.

Figure 2A:
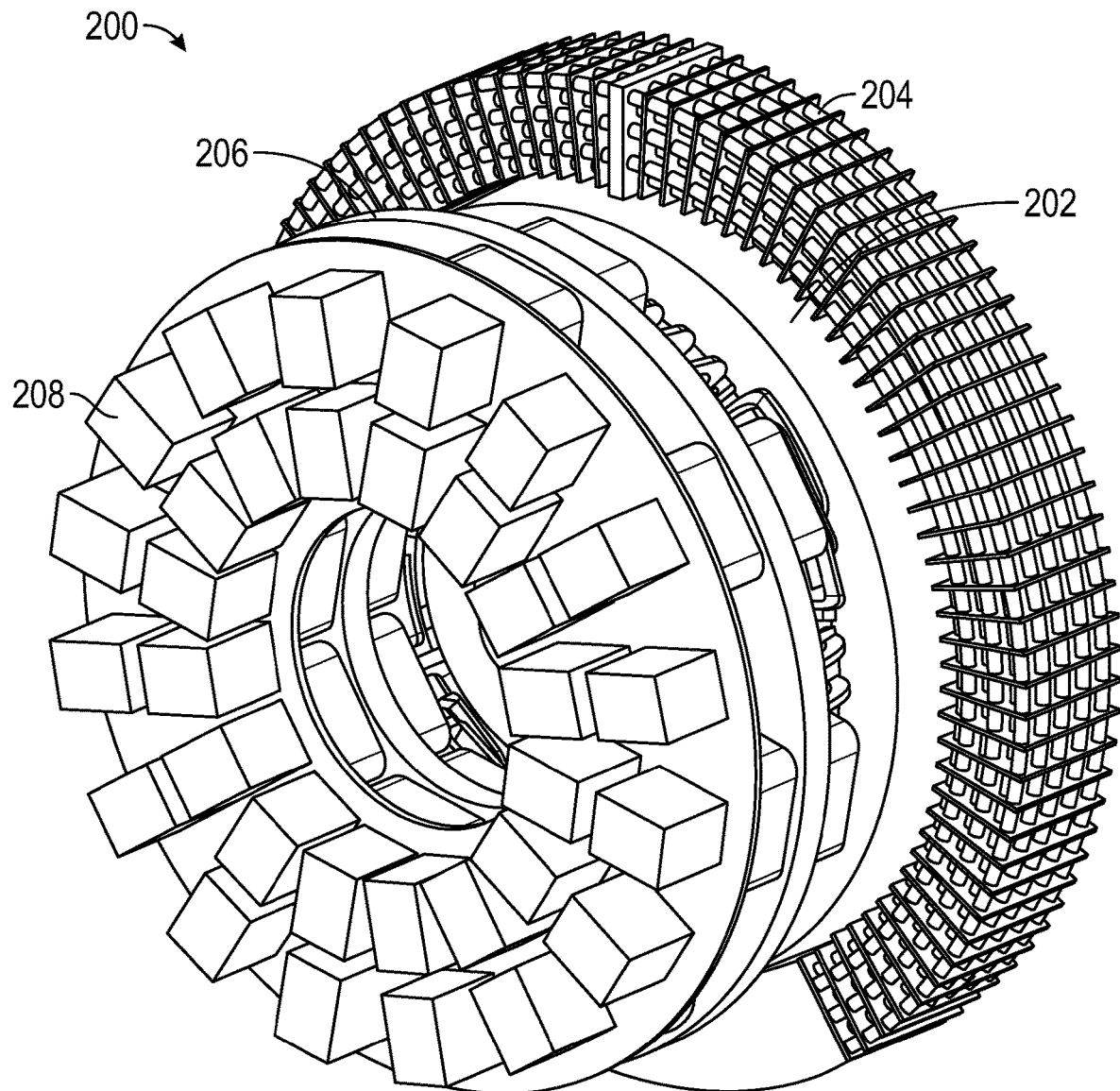
FIG. 2A is a schematic illustration of an aircraft electric motor in accordance with an embodiment of the present disclosure.
Figure 2B:
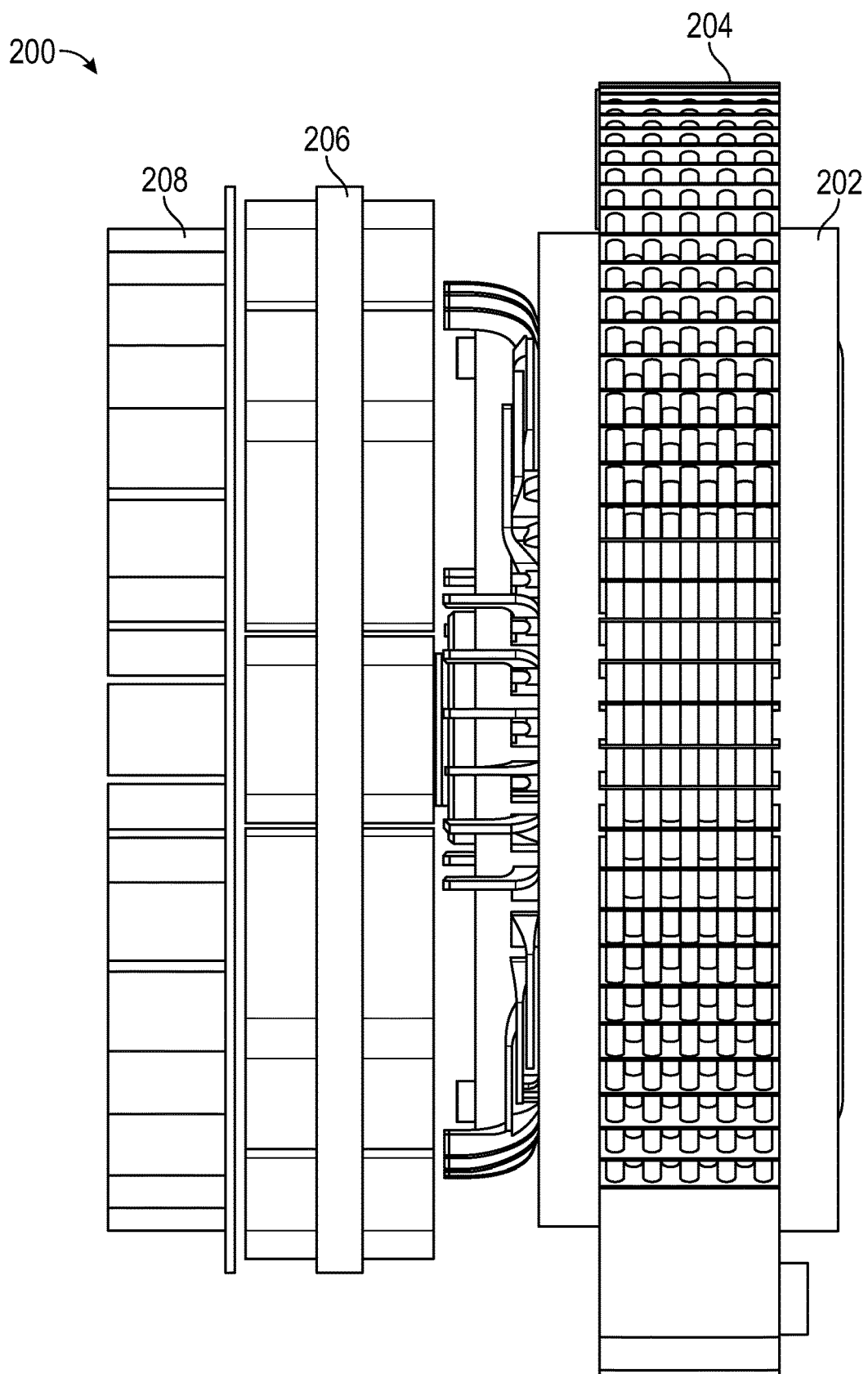
FIG. 2B is a side elevation view of the aircraft electric motor of FIG. 2A.
Figure 2C:
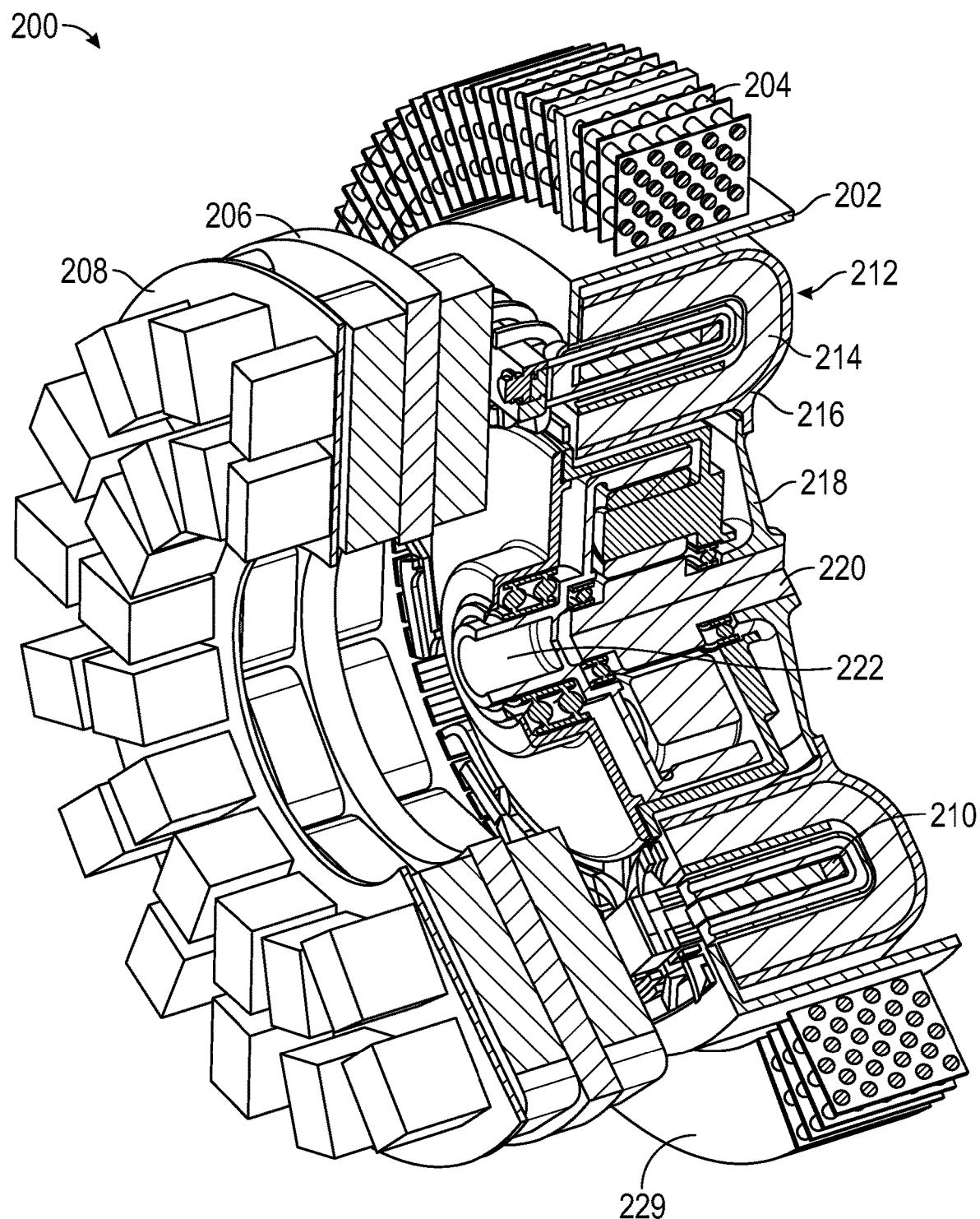
FIG. 2C is a partial cut-away illustration of the aircraft electric motor of FIG. 2A.
Figure 2D:
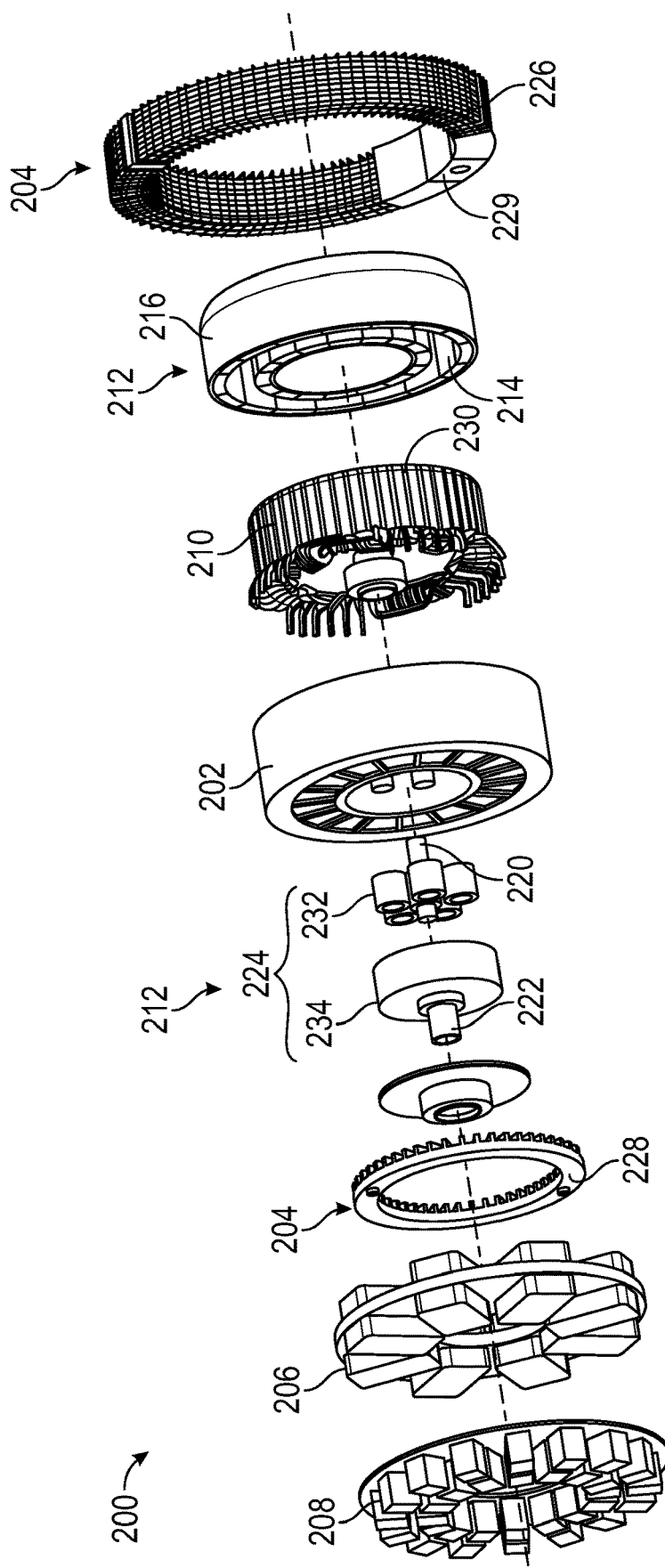
FIG. 2D is a separated-component illustration of the aircraft electric motor of FIG. 2A.

Turning now to FIGS. 2A-2D, schematic illustrations of an aircraft electric motor 200 in accordance with an embodiment of the present disclosure are shown. FIG. 2A is an isometric illustration of the aircraft electric motor 200, FIG. 2B is a side elevation view of the aircraft electric motor 200, FIG. 2C is a partial cut-away view illustrating internal components of the aircraft electric motor 200, and FIG. 2D is a schematic illustration of components of the aircraft electric motor 200 as separated from each other. The aircraft electric motor 200 includes a motor housing 202, a cooling system 204, a first power module system 206, and a second power module system 208.

The motor housing 202 houses a stator 210 and a rotor 212, with the rotor 212 configured to be rotatable about the stator 210. In this illustrative embodiment, the rotor 212 includes a U-shaped magnet 214 arranged within a similarly shaped U-shaped rotor sleeve 216. The rotor sleeve 216 is operably connected to a hub 218. The hub 218 is fixedly attached to a first shaft 220. The first shaft 220 is operably connected to a second shaft 222. In some configurations, the first shaft 220 may be a high speed shaft and may be referred to as an input shaft. In such configurations, the second shaft 222 may be a low speed shaft and may be referred to as an output shaft. The connection between the first shaft 220 and the second shaft 222 may be by a gear assembly 224, as described herein.

The cooling system 204 is configured to provide cooling to the components of the aircraft electric motor 200. The cooling system 204, as shown in FIG. 2D, includes a heat exchanger 226 and a header 228. The heat exchanger 226 and the header 228 may form a closed-loop cooling system that may provide air-cooling to a working fluid at the heat exchanger 226. The header 228 may be, in some configurations, a two-phase di-electric cooling header. A cooled working fluid may be pumped from the heat exchanger 226 into the header 228 using a pump 229 and distributed into embedded cooling channels 230 that are arranged within the stator 210. As the aircraft electric motor 200 is operated, heat is generated and picked up by the working fluid within the embedded cooling channels 230. This heated working fluid is then passed through the header 228 back to the heat exchanger 226 to be cooled, such as by air cooling. Although described as air-cooling, other cooling processes may be employed without departing from the scope of the present disclosure.

As shown, the heat exchanger 226 of the cooling system 204 may be a circular structure that is arranged about the motor housing 202. This configuration and arrangement allows for improved compactness of the system, which may be advantageous for aircraft applications. The rotor sleeve 216 with the magnets 214, the stator 210, and the gear assembly 224 fit together (although moveable relative to each other) within the motor housing 202, providing for a compact (low volume/size) design.

As noted above, the rotor sleeve 216 may be operably coupled to a first shaft 220 by the hub 218. The first shaft 220 may be operably coupled to a first gear element 232 and the second shaft 222 may be operably coupled to a second gear element 234. The first and second gear elements 232, 234 may form the gear assembly 224. The first and second gear elements 232, 234 are arranged to transfer rotational movement from the first shaft 220, which is driven in rotation by the hub 218 and the rotor sleeve 216 of the rotor 212, to the second shaft 222. In some embodiments, the first shaft 220 may be operably connected to a sun gear as the first gear element 232 that engages with a plurality of planetary gears and drives rotation of the second gear element 234 which may be operably connected to the second shaft 222. In some embodiments, the second shaft 222 may be connected to a fan or other component to be rotated by the aircraft electric motor 200.

The aircraft electric motor 200 includes the first power module system 206 and the second power module system 208. The first and second power module systems 206, 208 can include capacitors and other electronics, including, but not limited to, printed circuit boards (PCBs) that may enable control and operation of the aircraft electric motor 200. Again, the profile of the aircraft electric motor 200 of the present disclosure presents a low profile or compact arrangement that reduces the volume of the entire power system, which in turn can provide for improved weight reductions. In some embodiments, the first and second power module systems 206, 208 may be electrically connected to the stator 210 to cause an electric current therein. As the electric current will induce an electromagnetic field which will cause the rotor 212 to rotate.

Figure 3A:
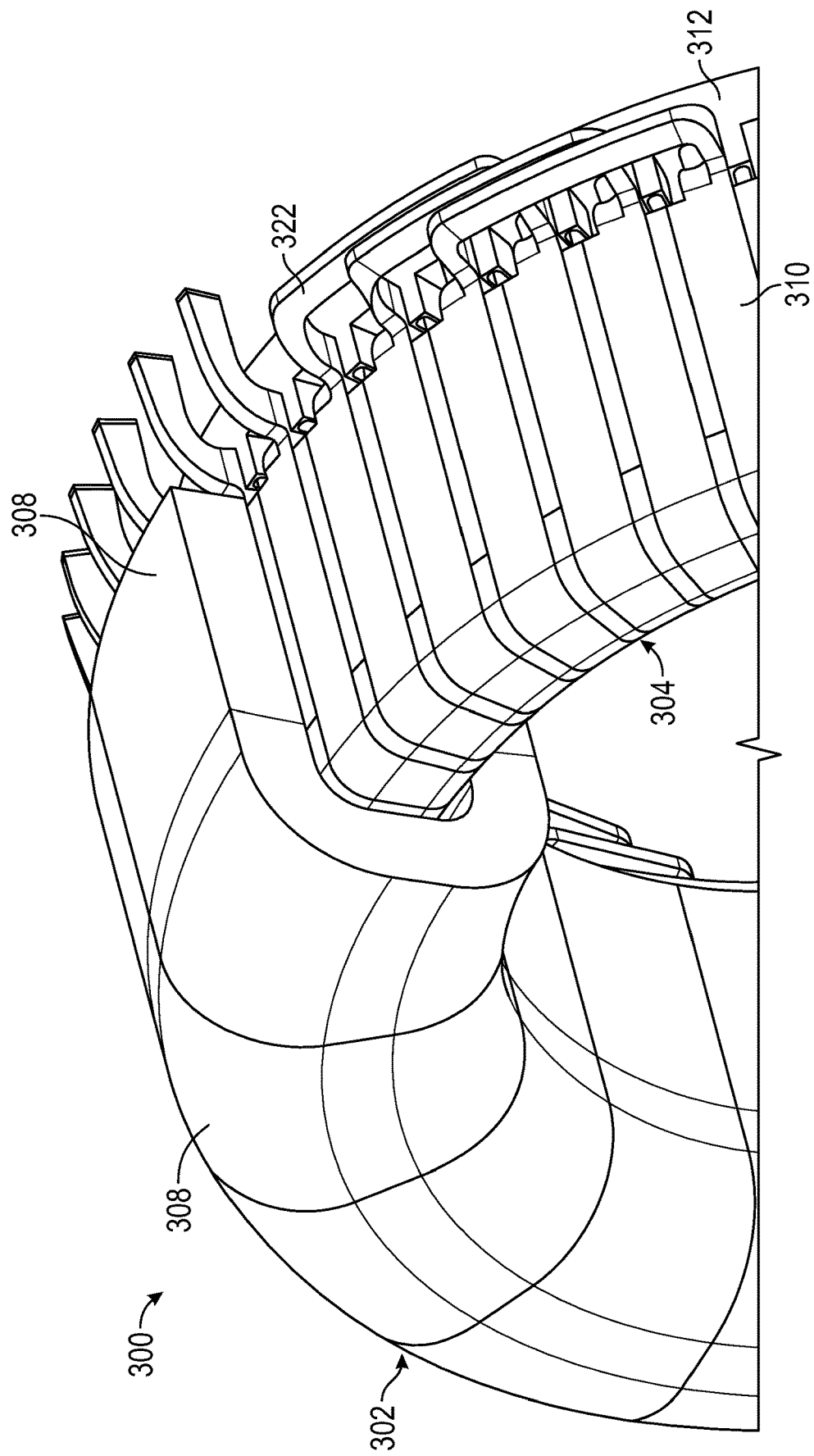
FIG. 3A is a schematic illustration of a rotor and stator of an aircraft electric motor in accordance with an embodiment of the present disclosure.
Figure 3B:
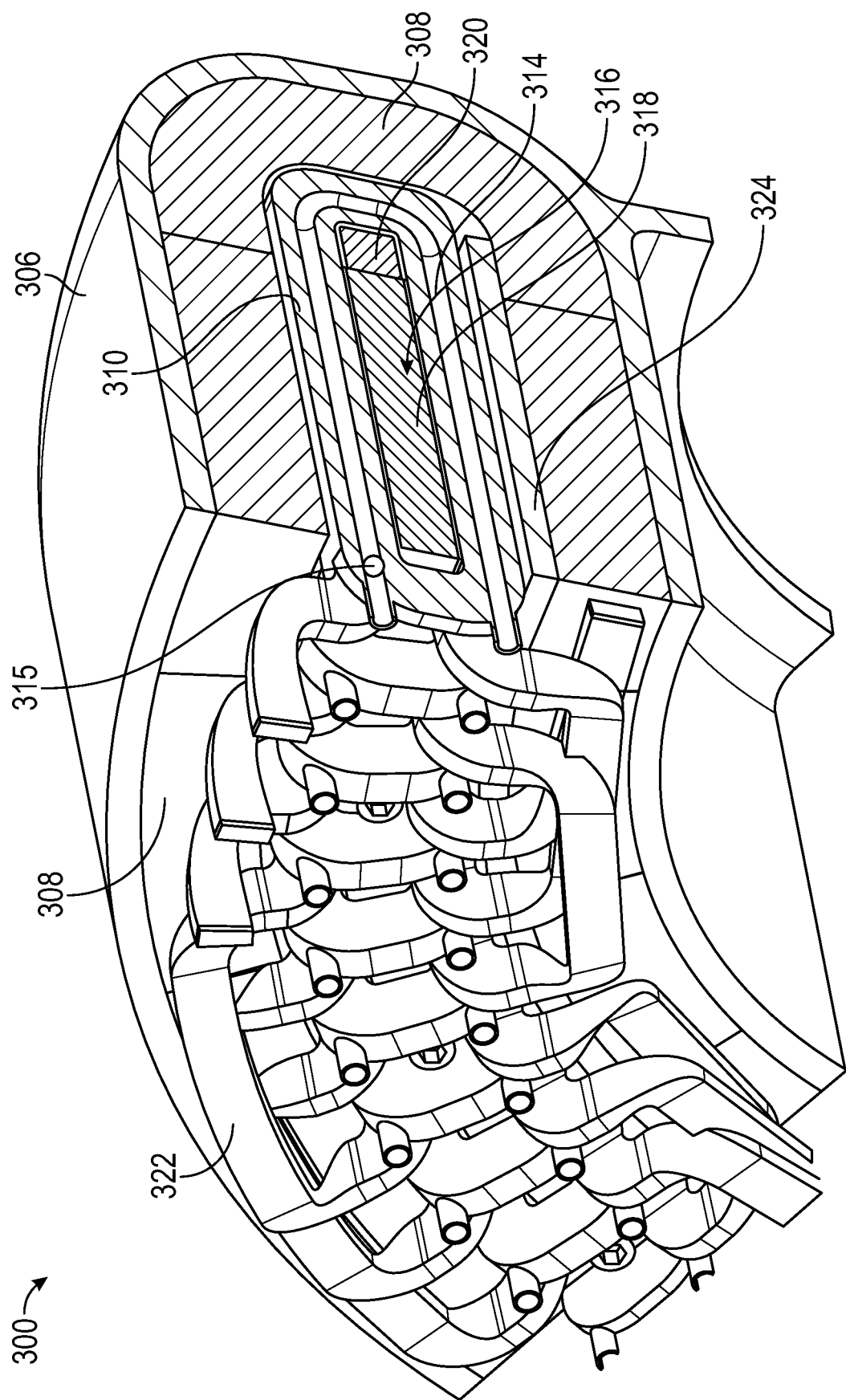
FIG. 3B is a schematic illustration of the rotor and stator of FIG. 3A as arranged within a rotor sleeve in accordance with an embodiment of the present disclosure.

Referring now to FIGS. 3A-3B, schematic illustrations of a portion of an aircraft electric motor 300 in accordance with an embodiment of the present disclosure is shown. FIGS. 3A-3B illustrate a portion of a rotor 302 and a stator 304 of the aircraft electric motor 300. FIG. 3A illustrates the rotor 302 and the stator 304 and FIG. 3B illustrates these components arranged within a rotor sleeve 306.

The rotor 302 is formed of a plurality of U-shaped magnets 308. In some configurations, the plurality of magnets 308 can be arranged with alternating polarity in a circular or annular structure. Arranged within the "U" of the U-shaped magnets 308 is the stator 304. The stator 304 is formed of a plurality of windings 310. In this configuration, the windings 310 are arranged with a header 312. The header 312 may be part of a cooling system, such as that shown and described above. The header 312 can be configured to cycle a working fluid through cooling channels 314 for cooling of the windings 310, as shown in FIG. 3B. As shown in FIG. 3B, the cooling channels 314 may include a flow restrictor 315 arranged at an inlet side (or an outlet side) of the cooling channel 314. The flow restrictor 315 may be used to throttle the flow of a cooling fluid to provide efficient cooling within the cooling channels 314. The flow restrictor 315 may be configured to manage the location of subcooled liquid and/or flow boiling within the cooling channels 314.

The windings 310 may be wrapped about a support structure 316. The support structure 316, in some embodiments and as shown in FIG. 3B, may include a laminate portion 318 and a magnetic portion 320. In some such embodiments, the laminate portion 318 may be formed from cobalt steel laminate and the magnetic portion 320 may be formed from a soft magnetic composite. The laminate portion 318 may be provided to capture in-plane flux from outer and inner rotor. The magnetic portion 320 may be provided to capture end rotor flux and may take a shape/filler in a gap through the end turns of the coil. The windings 308 include end connections 322 and may be electrically connected to one or more power module systems of the aircraft electric motor, such as shown above.

As shown in FIG. 3B, the magnets 306 are U-shaped and arranged within the rotor sleeve 306. The rotor sleeve 306 is a substantially U-shaped sleeve that is sized and shaped to receive the U-shaped magnets 308. In this illustrative configuration, the rotor sleeve 306 can include an inner sleeve 324. The inner sleeve 324 may be configured to provide support to a portion of the magnets 308. It will be appreciated that there is no direct contact between the windings 310 and the magnets 308. This lack of contact enables free rotation of the rotor 302 relative to the stator 304 during operation.

High-power-density aviation-class electric motor and drives, such as those shown and described above, may require advanced cooling technologies. These machines are generally thermally limited at high power ratings and their performance can be improved by mitigating thermal limitations. Accordingly, embodiments of the present disclosure are directed to improved cooling schemes for aircraft electric motors (e.g., as described above). Embodiments of the present disclosure are directed to employing a two-phase cooling scheme to improve cooling at high load locations (e.g., within windings of the motor). Two-phase cooling is a highly efficient approach for cooling the heat generating components. Non-uniform flow (e.g., liquid/vapor phase) distribution, where some channels receive insufficient liquid coolant, is a critical risk in a two-phase cooling approach. Both to improve flow distribution in motor channels and to optimize overall performance of the thermal management system, the loop architecture in accordance with embodiments of the present disclosure can be optimized so that the more critical components receive more coolant liquid (as compared to vapor or a mixture).

Figure 4:
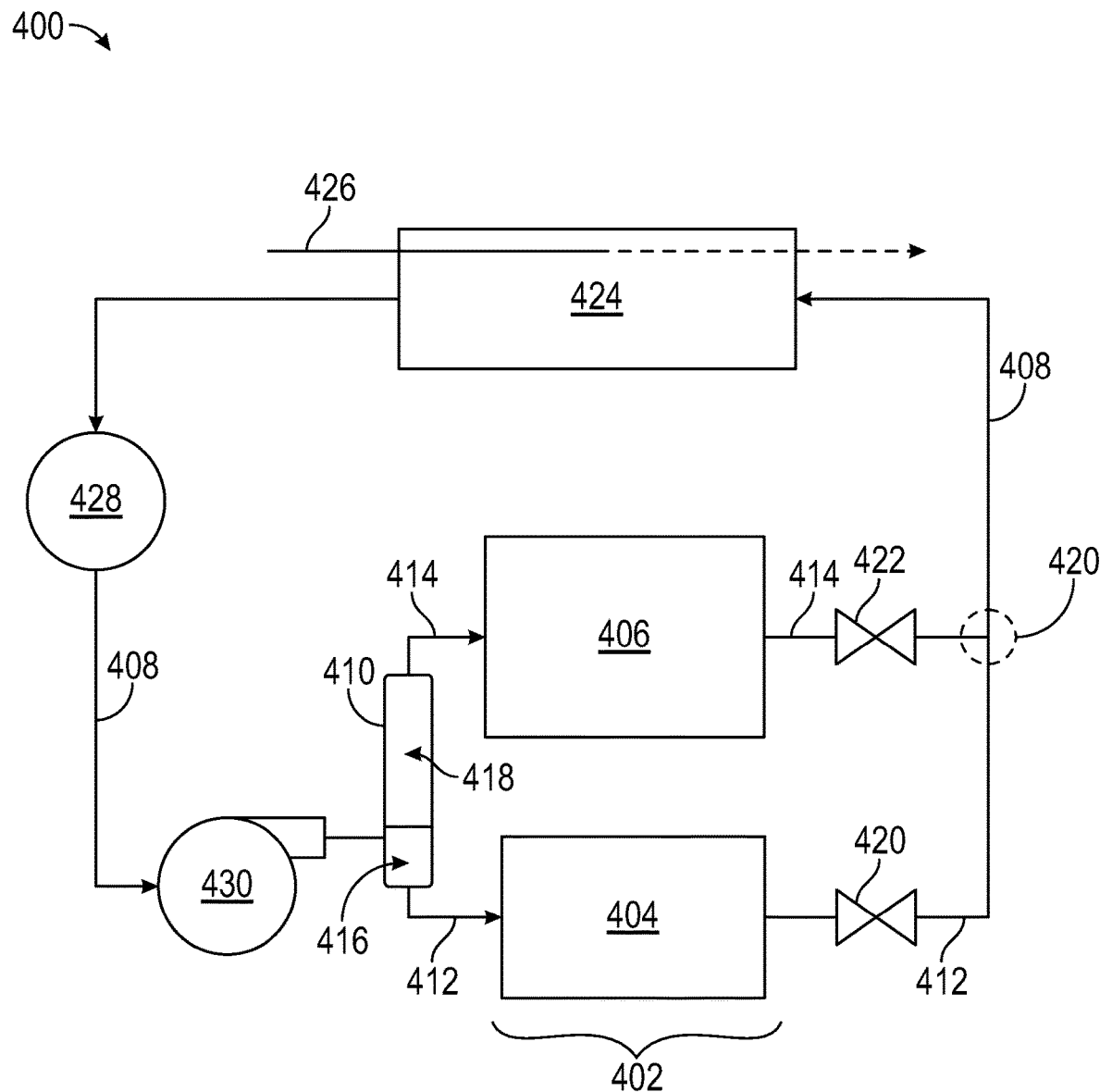
FIG. 4 is a schematic illustration of an aircraft electric motor system in accordance with an embodiment of the present disclosure.

Turning now to FIG. 4, a schematic illustration of a motor system 400 in accordance with an embodiment of the present disclosure is shown. The motor system 400 may include an aircraft electric motor 402 that is operably connected to a cooling system, as described herein. The aircraft electric motor 402 includes a motor unit 402 and a drive unit 404. The motor unit 404 may include windings, magnets, support structures, etc. as shown and described above. The drive unit 406 may include power modules, electronic components, and the like.

To provide cooling to the motor unit 404 and/or the drive unit 406, the motor system 400 includes a cooling scheme that has a cooling fluid flow path 408. A working fluid may be passed through the cooling fluid flow path 408 to provide cooling to components arranged along the cooling fluid flow path 408 (e.g., motor unit 404, drive unit 406, etc.). The working fluid may be a saturated refrigerant (e.g., dielectric refrigerants including, but not limited to, hydrofluorocarbons (HFC), hydrofluro-olefins (HFO), and/or hydrofluoroethers (HFE)). As the working fluid passes through the cooling fluid flow path 408, the working fluid may undergo phase change such that both vapor and liquid components of the working fluid may pass through portions of the cooling fluid flow path 408. Because of the increased load capacity of liquid (as compared to vapor phases), it may be preferable to have a substantially pure liquid phase of the working fluid pass through and cool the motor unit 404. To achieve such substantially pure liquid phase of the working fluid, the motor system 400 includes a separator 410 arranged upstream of the motor unit 404 and the drive unit 406.

The separator 410 is configured to separate the working fluid into two flow streams along a liquid cooling path 412 and a vapor cooling path 414 (of the working fluid flow path 408). The separator 410 is configured to create a liquid supply 416 of the working fluid to be conveyed along the liquid cooling path 412 and a vapor supply 418 of the working fluid to be conveyed along the vapor cooling path 414. It will be appreciated that the liquid supply 416 may include some entrained or portion that is still in vapor form, but such percentage of volume is minimal. For example, the liquid supply 416 may be configured to supply a working fluid being at least 75% (by volume) liquid working fluid to the motor unit 404. Similarly, the vapor supply 418 may include some entrained or portion that is still in liquid form (e.g., liquid droplets), but such percentage of volume is minimal. For example, the vapor supply 416 may be configured to supply a working fluid being at least 95% (by volume) vapor working fluid to the drive unit 404.

After providing cooling to the aircraft electric motor 402, the two flows of the working fluid may be rejoined at a mixer 420. The mixer 420 may be a manifold or other structure where the flow along the liquid cooling path 412 and the vapor cooling path 414 are rejoined or combined to create a single flow of working fluid downstream from the aircraft electric motor 402. The flow through the liquid cooling path 412 may be controlled by an optional control valve 422 arranged along the liquid flow path 412 and the flow through the vapor cooling path 414 may be controlled by an optional control valve 424 arranged along the vapor flow path 414.

The merged or joined flows of the working fluid, at the mixer 420, are then passed into and through a heat exchanger 424 (e.g., a condenser). The heat exchanger 424 receives the working fluid of the motor system 400 as a first fluid and a cooling fluid 426 as a second fluid. The cooling fluid 426 may be air or other fluid, such as a refrigerant, a gas, a liquid, etc. In some embodiments, the heat exchanger 424 may be substantially similar to the heat exchanger 226 with the header 228 shown and described above. In other embodiments, the heat exchanger 424 may be arranged separate from the motor system 400 (e.g., not arranged about the motor system). As the working fluid of the motor system 400 passes through the heat exchanger 424, the temperature of the working fluid will decrease, thus causing most or all the working fluid to either remain or phase change to a liquid state. The cooled (and liquid) working fluid may then be passed into a reservoir 428. The reservoir 428 may be configured to collect and store liquid state working fluid of the motor system 400.

A pump 430 is arranged along the working fluid flow path 408. The pump 430 is configured to impart a motive force to cause the working fluid to flow along the working fluid flow path 408. In some embodiments, the pump 430 may be configured to extract liquid working fluid from the reservoir 428 to drive the working fluid through the aircraft electric motor 402 and provide cooling thereto. Although the pump 430 is configured to pump a liquid state fluid, the pumping action and the nature of a saturated refrigerant may cause vapor to form within the working fluid flow path 408. Thus, the separator 410 is arranged to separate these two states of the working fluid and direct them along the respective liquid cooling path 412 and vapor cooling path 414.

As a result of the disclosed working fluid flow path 408 using a two-phase refrigerant, liquid (higher load) working fluid (e.g., cooling fluid) may be directed to the components that require the highest heat removal (e.g., motor unit 404). That is, by employing a split-line, two-phase cooling scheme, embodiments of the present disclosure can ensure more critical components receive more coolant liquid (as compared to vapor).

In operation of the motor system 400, a saturated refrigerant is separated into vapor and liquid phases at the separator 410. The liquid portion is fed to motor winding cooling channels within the motor unit 404 along the liquid cooling path 412. The vapor portion, and any remaining liquid droplets, are used to cool the less demanding drive electronics. Such as the drive unit 406 along the vapor cooling path 414. Subcooled liquid flow entering cooling channels of the motor unit 404 may be throttled through a restriction at the inlet of the channels in order to provide efficient cooling thereto. That is, the liquid cooling flow path 412 may include one or more flow restrictors at the inlet side of cooling channels within windings of a motor (e.g., at an inlet of cooling channels 314 for cooling of the windings 310). The header manifold (e.g., header 228) feeding motor channels with the working fluid may act as the separator (e.g., separate 410) where vapor is extracted at the top and fed to components of the drive unit 406. In some embodiments, through control of the control valves 420, 422, an actively controlled flow of the working may be achieved. Such control can ensure that more liquid is directed to hot spots as needed. For example, if excess heat is detected or if some components are overloaded in case of failure of other components, then additional or preferential flow of cooling may be directed into and through the liquid cooling flow path 412 and into the motor unit 404.

Figure 5:
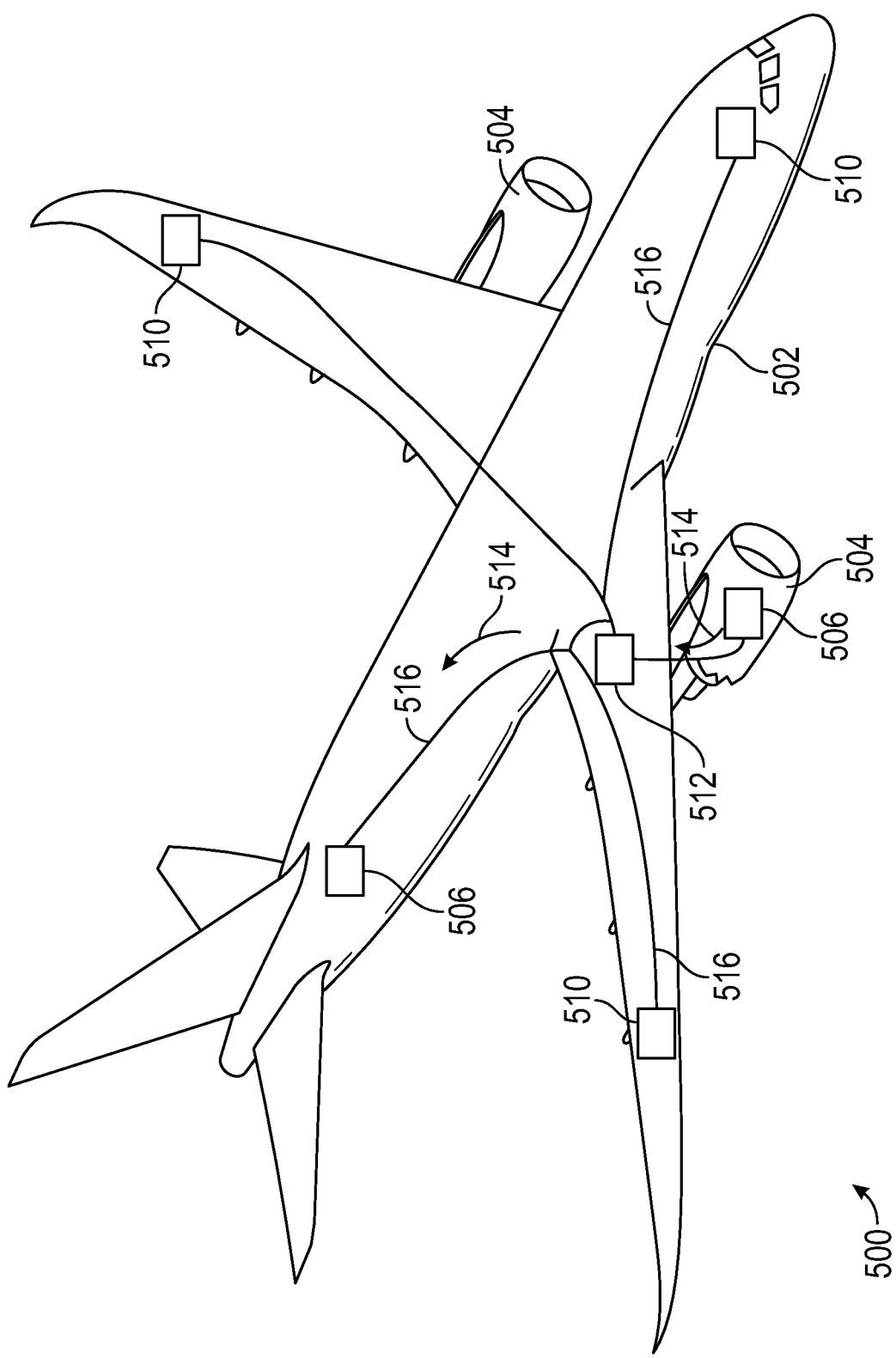
FIG. 5 is a schematic view of a power system of an aircraft that may employ embodiments of the present disclosure.

Referring now to FIG. 5, a power system 500 of an aircraft 502 is shown. The power system 500 includes one or more engines 504, one or more electric motors 506, a power bus electrically connecting the various power sources 504, 506, and a plurality of electrical devices 510 that may be powered by the engines 504 and/or motors 506. The power system 500 includes a power distribution system 512 that distributes power 514 through power lines or cables 516. The electric motors 506 of the aircraft 502 may be configured similar to the aircraft electric motors shown and described above.

Advantageously, embodiments of the present disclosure provide for improved electric motors for aircraft and aviation applications. The aircraft electric motors of the present disclosure have improved cooling, which may enable higher operating temperatures and/or loads. Further, because of the separation of the liquid and vapor phases of the cooling working fluid, improved flow distribution through the motor cooling channels may be achieved. The systems described herein may be closed loop, even with the inclusion of the separation of the two phases of the working fluid, and through one or more controller and/or valves, preferential cooling may be achieved by directing liquid cooling fluid to components that may require an increased cooling load (e.g., excessive heat, compensation for a failed component, etc.).

The terms "about" and "substantially" are intended to include the degree of error associated with measurement of the particular quantity based upon the equipment available at the time of filing the application. For example, "about" or "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft electric motor comprising:
   a motor unit having a rotor and a stator, wherein the stator includes a plurality of windings and cooling channels arranged to provide cooling to the plurality of windings;
   a drive unit configured to drive operation of the motor unit; and
   a cooling system comprising:
      a working fluid arranged within a cooling fluid flow path, wherein the cooling fluid flow path includes a liquid cooling path configured to direct flow of the working fluid through, at least, the cooling channels of the motor unit and a vapor cooling path configured to direct flow of the working fluid through the drive unit; and
      a separator arranged upstream of each of the liquid cooling path and the vapor cooling path and configured to direct a liquid portion of the working fluid into the liquid cooling path and configured to direct a vapor portion of the working fluid into the vapor cooling path.

2. The aircraft electric motor of claim 1, further comprising a heat exchanger arranged along the cooling fluid flow path and configured to cool the working fluid to a liquid state.

3. The aircraft electric motor of claim 2, further comprising a mixer arranged along the cooling fluid flow path downstream of the motor unit and the drive unit and upstream of the heat exchanger, the mixer configured to merge the flow of the liquid cooling path and the vapor cooling path.

4. The aircraft electric motor of claim 2, wherein the working fluid is a first fluid of the heat exchanger and air is a second fluid of the heat exchanger, wherein the air passed through the heat exchanger to cool the working fluid.

5. The aircraft electric motor of claim 1, further comprising a reservoir configured to contain the working fluid in a liquid state to be supplied to the separator.

6. The aircraft electric motor of claim 1, further comprising a pump arranged upstream of the separator and configured to provide a motive force to the working fluid to flow through the cooling fluid flow path.

7. The aircraft electric motor of claim 1, further comprising a control valve arranged along the liquid cooling flow path to control a flow rate of the working fluid through the liquid cooling flow path.

8. The aircraft electric motor of claim 1, further comprising a control valve arranged along the vapor cooling flow path to control a flow rate of the working fluid through the vapor cooling flow path.

9. The aircraft electric motor of claim 1, wherein the vapor cooling path includes both a vapor state of the working fluid and liquid droplets of the working fluid.

10. The aircraft electric motor of claim 1, wherein the working fluid is a saturated refrigerant.

11. The aircraft electric motor of claim 10, wherein the refrigerant is a hydrofluorocarbon (HFC), a hydrofluroolefin (HFO), or a hydrofluoroether (HFE).

12. The aircraft electric motor of claim 1, wherein the windings are arranged in a U-shape configuration.

13. The aircraft electric motor of claim 1, wherein the separator is part of a header fluidly connected to the cooling channels.

14. The aircraft electric motor of claim 1, wherein at least one cooling channel includes a restrictor configured to control flow through the respective cooling channel.

15. The aircraft electric motor of claim 1, wherein the liquid portion is at least 75% liquid state working fluid.

16. The aircraft electric motor of claim 1, wherein the vapor portion is at least 95% vapor state working fluid.

17. The aircraft electric motor of claim 1, wherein the rotor and stator are arranged in an annular configuration.

18. The aircraft electric motor of claim 17, wherein the stator is arranged within the rotor.

19. An aircraft electric motor comprising:
a motor unit having a rotor and a stator, wherein the stator includes a plurality of windings and cooling channels arranged to provide cooling to the plurality of windings;
a drive unit configured to drive operation of the motor unit; and
a cooling system comprising:
a working fluid arranged within a cooling fluid flow path, wherein the cooling fluid flow path includes a liquid cooling path configured to direct flow of the working fluid through, at least, the cooling channels of the motor unit and a vapor cooling path configured to direct flow of the working fluid through the drive unit;
a separator arranged upstream of each of the liquid cooling path and the vapor cooling path and configured to direct a liquid portion of the working fluid into the liquid cooling path and configured to direct a vapor portion of the working fluid into the vapor cooling path; and
a mixer arranged along the cooling fluid flow path and configured to merge the flow of the liquid cooling path and the vapor cooling path at a location downstream of the motor unit and the drive unit.

20. An aircraft electric motor comprising:
a motor unit having a rotor and a stator, wherein the stator includes a plurality of windings and cooling channels arranged to provide cooling to the plurality of windings;
a drive unit configured to drive operation of the motor unit; and
a cooling system comprising:
a working fluid arranged within a cooling fluid flow path, wherein the cooling fluid flow path includes a liquid cooling path configured to direct flow of the working fluid through, at least, the cooling channels of the motor unit and a vapor cooling path configured to direct flow of the working fluid through the drive unit; and
a separator arranged upstream of each of the liquid cooling path and the vapor cooling path and configured to direct a liquid portion of the working fluid into the liquid cooling path and configured to direct a vapor portion of the working fluid into the vapor cooling path;
wherein the windings are arranged in a U-shape configuration and wherein the motor unit comprises a rotor having U-shaped magnets arranged about the windings of the stator.

* * * * *